(12) United States Patent
Lee (10) Patent No.: US 6,301,485 B1
(45) Date of Patent: Oct. 9, 2001

(54) TRANSMISSION POWER CONTROL METHOD IN MOBILE COMMUNICATION SYSTEM

(75) Inventor: Kyung Kuk Lee, Seoul (KR)

(73) Assignee: LG Information & Communications, Ltd., Seoul (KR)

(*) Notice: Subject to any disclaimer, the term of this patent is extended or adjusted under 35 U.S.C. 154(b) by 0 days.

(21) Appl. No.: 09/223,768

(22) Filed: Dec. 31, 1998

(30) Foreign Application Priority Data

Dec. 26, 1998 (KR) ................................. 98-58706

(51) Int. Cl.[7] ..................................... H04Q 7/20

(52) U.S. Cl. ................... 455/522; 455/69; 370/342

(58) Field of Search ................. 455/69, 522; 370/335, 370/342

(56) References Cited

U.S. PATENT DOCUMENTS 5,396,516 * 3/1995 Padovani et al. .................. 375/225
5,940,743 * 8/1999 Sunay et al. ........................ 455/69
6,101,179 * 8/2000 Soliman ............................ 370/342

* cited by examiner

*Primary Examiner*—Lee Nguyen
(74) *Attorney, Agent, or Firm*—Fleshner & Kim, LLP (57) ABSTRACT

A transmission power control method in a mobile communication system using a code division multiple access (CDMA) method includes: a power control process in an access mode having: a step of measuring a transmission power of an initial access channel transmitted from a terminal; a step of comparing the measured transmission power level with a pre-setted adequate power level; a step of transmitting a transmission power adjusting message to the terminal according to the comparison result; and a step of the terminal adjusting the transmitting power of the traffic channel to the adequate power level according to the transmission power adjusting message transmitted from a base station; and a power control process in a traffic mode having: a step of measuring the transmission power level of the traffic channel transmitted from the terminal; a step of comparing the measured transmission power level with the pre-setted adequate power level; a step of transmitting an one-bit power control bit to the terminal according to the comparison result; and a step of the terminal increasing/decreasing the transmitting power of the traffic channel by 1 dB according to the power control bit transmitted from the base station.

39 Claims, 6 Drawing Sheets

TRANSMISSION POWER CONTROL METHOD IN MOBILE COMMUNICATION SYSTEM

BACKGROUND OF THE INVENTION

1. Field of the Invention

The present invention relates to a mobile communication system, and in particular to a transmission power control method in a mobile communication system employing a code division multiple access (CDMA) method.

2. Description of the Background Art

In mobile communication systems using a code division multiple access (CDMA) method, such as a cellular mobile communication system and a personal communication service system, a plurality of mobile stations transmit/receive a frame consisting of symbols expressing a digitalized voice or other data through a base station or cell site.

In general, a maximum transmission power of the mobile station (terminal) is set according to a cell with a greatest radius. However, the mobile station always moves in a given cell. Thus, when some mobile stations are located closely to the base station, the others may be not. The terminals located closely to the base station have strong signals. In case the terminals with the strong signals are not controlled, they may cause unnecessary interference with the other terminals in association with transmission frames.

To the contrary, when the signal is transmitted by using a excessively low transmission power, the data of the frame which have been transmitted cannot be recovered, thus losing the data. Accordingly, the base station or mobile station controls the frame transmission power to minimize fading or interference through a multiple path and to completely recover the data to be transmitted.

A function of properly setting the transmission power according to the signal quality during the communication is the transmission power control, which is obtained by carrying out a dynamic power control between the mobile station (terminal) and base station.

The transmission power control process between the mobile station and base station will now be described in detail with reference to the accompanying drawings.

Figure 1:
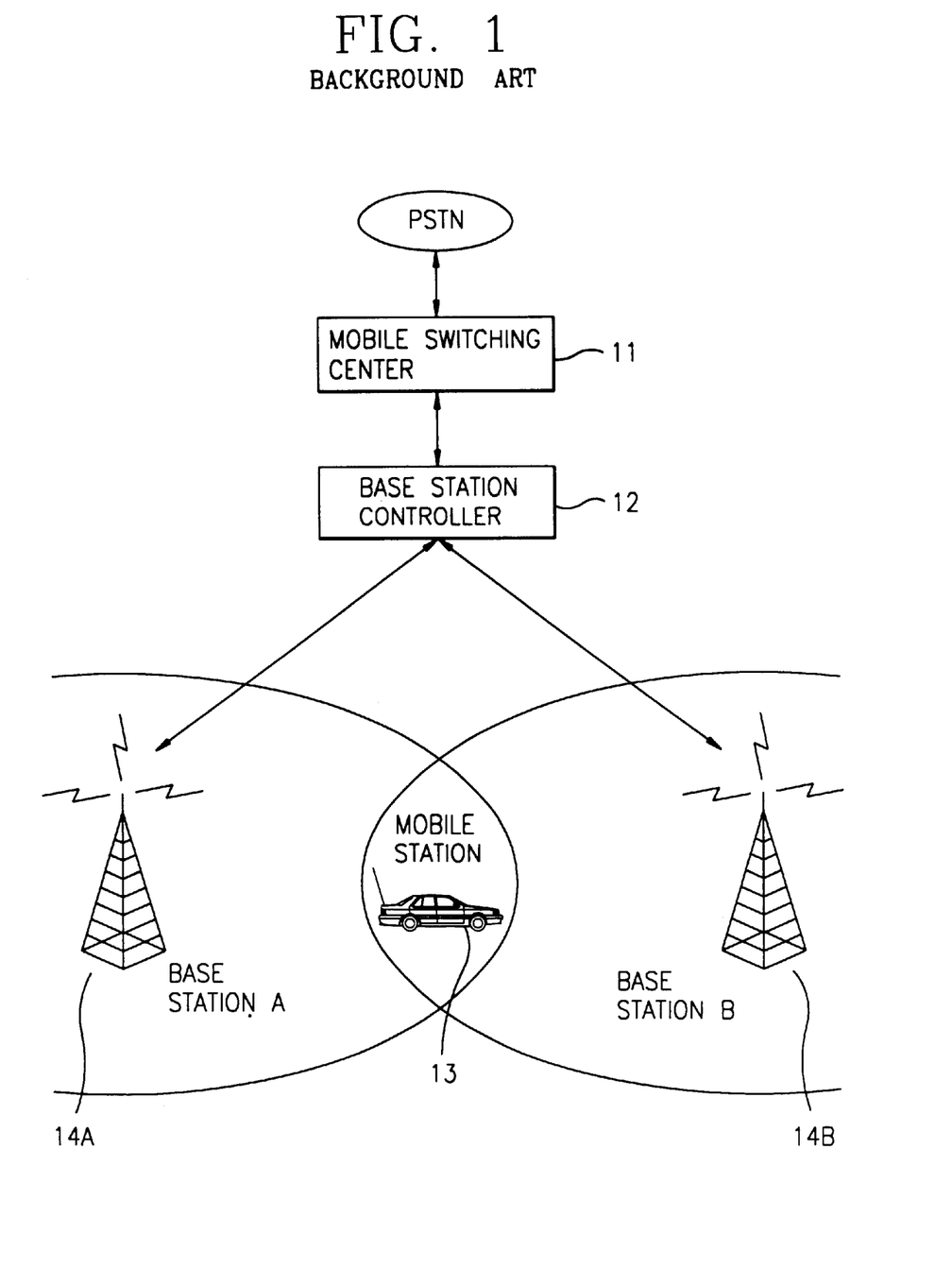
FIG. 1 is a schematic block diagram illustrating a general CDMA mobile communication system.

FIG. 1 is a schematic block diagram illustrating the conventional mobile communication system employing the CDMA method. A public switched telephone network (PSTN) is a communication network for normal telephone users provided by a communication network provider. The PSTN forms a wire communication path with a mobile switching center (MSC) 11 switching a circuit between users and processing relayed calls in order for the mobile communication user to communicate with another mobile communication user or a normal wire network user by using the mobile communication service.

In addition, a base station controller (BSC) 12 controls the power by using an error rate of the frames which have been received, and thus generates a power control order so as for the mobile station 13 to transmit/receive the data through base station A 14A or B 14B by employing a proper volume of transmission power.

Figure 2:
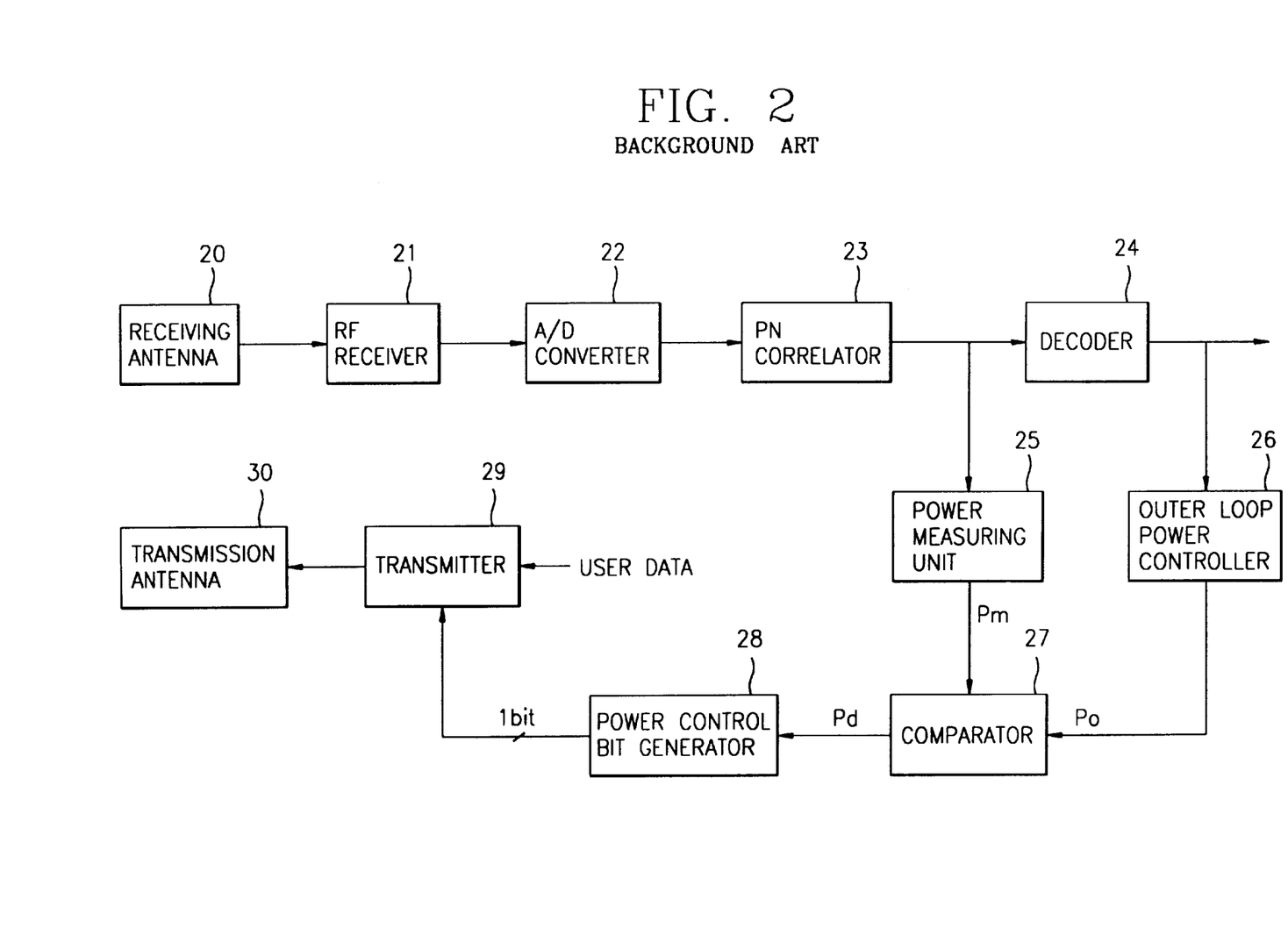
FIG. 2 is a block diagram illustrating a conventional power transmission control device of a base station.

FIG. 2 is a block diagram partially illustrating a power control device of the base station in the conventional mobile communication system using the CDMA method.

A spread-spectrum signal which has been transmitted from the mobile station (not shown) is received by a receiving antenna 20 and inputted to an RF receiver 21. The RF receiver 21 performs a down-frequency process on the inputted signal, converts the signal to a baseband signal, and outputs the converted signal.

The signal which has been down-frequency processed by the RF receiver 21 is converted to a digital signal in an A/D converter 22. A pseudo noise (PN) correlator 23 correlates the digital signal by using a PN code provided by a PN code generator (not shown).

Then, the signal which has been outputted from the PN correlator 23 is inputted to a decoder 24 and to a power measuring unit 25 for measuring the transmission power of the mobile station (not shown) which has transmitted the signal.

The decoder 24 decodes a code symbol regarding the inputted signal, and at the same time provides an outer loop power controller 26 with a code error metrics indicating a quality of the CDMA signal.

Accordingly, the outer loop power controller 26 is informed of an amount of transmission power required for the mobile station (not shown) to transmit the data, sets a power control reference value Po to be used for controlling the power of a reverse direction link, and provides it to a comparator 27.

The comparator 27 compares a transmission power level Pm of the mobile station (not shown) measured by the power measuring unit 25 with the power control reference level Po provided by the outer loop power controller 26, computes a power deviation Pd between the measured transmission power value Pm and the power control reference value Po, and provides it to a power control bit generator 28.

The power control bit generator 28 applies to a transmitter 29 an one-bit power control bit increasing or decreasing the transmission power than a current level by 1 dB according to the inputted power deviation Pd.

The transmitter 29 transmits the one-bit power increase or decrease bit outputted from the power control bit generator 28 to the mobile station (not shown) through a transmitting antenna 30 with a user data which has been up-frequency processed.

The mobile station (not shown) adjusts the transmission power according to the power increase/decrease order from the base station, and transmits the data by using the proper amount of transmission power.

Here, the power control performed by the power measuring unit 25, comparator 27 and power control bit generator 28 is a closed loop power control. The base station predicts a receiving power according to a transmission speed of the signal transmitted from the mobile station, compares the predicted receiving power with the power control reference values Po which have been pre-setted in every base station, and transmits the proper power control order to the mobile station with the user data, thereby enabling the mobile station to transmit the signal by using the adjusted transmission power according to the power control order.

When the closed loop power control is carried out, each mobile station sets different power control reference values Po according to various parameters, such as a mobile speed of the mobile station and a circumstantial state thereof. Here, the base station controller (BSC) suitably adjusts the power control reference values Po according to the frame error rate of the data received by the outer loop power controller 26. The above-described power control is an outer loop power control.

On the other hand, the power control bit generator 28 generates the power increase or decrease bit according to the power deviation Pd inputted from the comparator 27. An one-bit power control bit has been generally used for increasing or decreasing the current transmission power level by 1 dB.

Figure 3A:
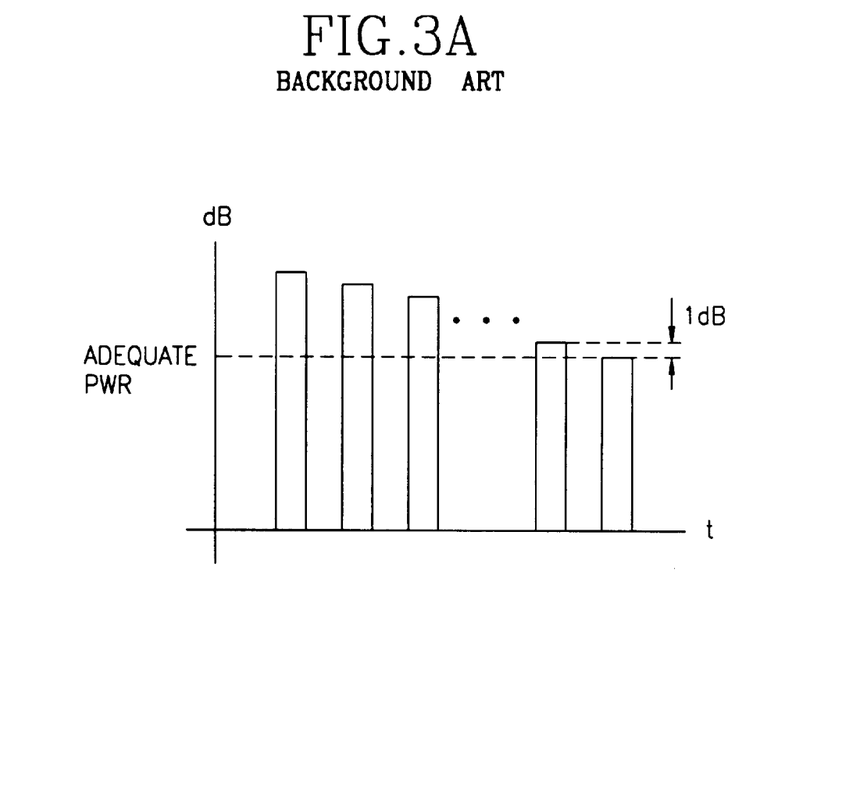
FIGS. 3a and 3b respectively illustrate a state of changing a transmission power level of a terminal according to a conventional transmission control method.
Figure 3B:
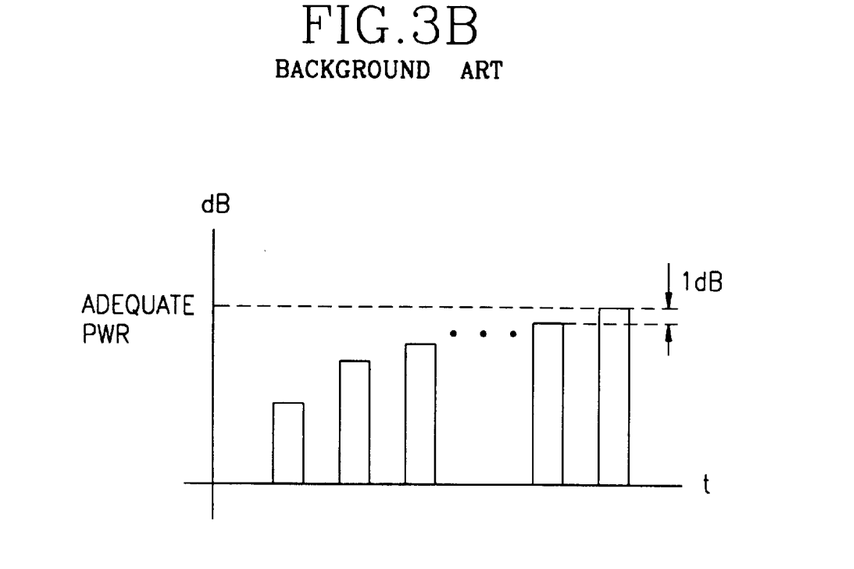

That is to say, as illustrated in FIG. 3a, when the measured transmission power level Pm is greater than the power control reference value Po, it is repeatedly decreased by 1 dB. As shown in FIG. 3b, in the case that the measured transmission power level Pm is smaller than the power control reference level Po, it is repeatedly increased by 1 dB.

Accordingly, when the deviation between the measured power level Pm and the reference level Po is great, there is a disadvantage that it takes a longer time to control the measured level Pm to an adequate proper level.

When the terminal tries to access, an initially-transmitted power is determined by using the open loop power control method. The power to be transmitted is determined by the following expression by employing the power currently received by the terminal.

Mean output power(dBM) = − mean input power(dBM)
− offsetpower
+ NOR_PWR 16*NOR_PWR_EXT
+ INIT_PWR The mean input power indicates an average power which the terminal receives the signal transmitted from the corresponding base station. The offset power of 73 dBm is used for the cellular mobile communication system and the offset power of 76 dBm is employed for the PCS, which are determined by the field test. NOR_ PWR and INT_ PWR are system parameters determined by an access parameters message transmitted from the base station. NOR_ PWR_ EXT is determined by an extended handoff direction message.

Here, the offset power is generally averagely determined by considering a load of the cells resulting from the number of the users operating in the current cell. That is, the terminal cannot be informed of the number of the users operating in the current cell, and thus does not know the amount of interference in the cell. Therefore, the offset power used in the cellular system or PCS system is averagely determined.

In case the cell where the user intending to access belongs is in an excessive load state, or the base station cannot receive an access signal from the terminal due to several damping reasons, the terminal cannot receive an acknowledge signal from the base station communicating that the base station receives the access signal. Thus, the terminal transmits the access signal gradually increasing the power of an access probe until the base station receives the access signal.

Accordingly, if the offset power is set smaller, it is difficult for the base station to sense the access signal. In this case, if the terminal constantly increases the power of the access channel, it takes a longer time to access. Therefore, the initial transmission power during the access is generally set at a sufficiently high level for the base station to easily recognize the access signal.

However, the terminal tries to access by using identical power even when the terminal is located closely to the base station or the cell load is smaller, and thus the power is unnecessarily consumed, which results in life span reduction of a terminal battery.

In addition, the terminal accesses with an unnecessarily high power, and thus may cause interference with the other users, thereby reducing capacity of the entire system.

When the terminal succeeds in accessing, is provided with a channel from the base station, and transmits a data through a traffic channel, the terminal transmits the traffic channel by using an identical power level to when it tries to access through the access channel. Then, as described above, the terminal constantly decreases the power by 1 dB, and thus it takes a longer time to adjust the power level to the adequate one, which results in high power consumption.

SUMMARY OF THE INVENTION

It is therefore an object of the present invention to provide a transmission power control method in a mobile communication system which can adjust a transmission power level to an adequate one at a time during an access operation of a terminal.

In order to achieve the object of the present invention, there is provided a transmission power control method in a mobile communication system using a code division multiple access (CDMA) method, including: a power control step in an access mode having: a step of measuring a transmission power of an initial access channel transmitted from a terminal; a step of comparing a measured transmission power level of the access channel with a pre-setted adequate power level; and a step of transmitting a transmission power adjusting message to the terminal according to the comparison result; a step of the terminal adjusting the transmission power of a traffic channel to the adequate power level according to the transmission power adjusting message transmitted from a base station; and a power control step in a traffic mode having: a step of measuring the transmission power of the traffic channel transmitted from the terminal; a step of comparing the measured transmission power level with the pre-setted adequate power level; a step of transmitting an one-bit power control bit to the terminal according to the comparison result; and a transmission power minute adjusting step of the terminal increasing/decreasing the transmission power of the traffic channel by a certain amount according to the power control bit transmitted from the base station.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A transmission power control method in a code division multiple access (CDMA) mobile communication system according to a preferable embodiment of the present invention will now be described with reference to the accompanying drawings.

Figure 4:
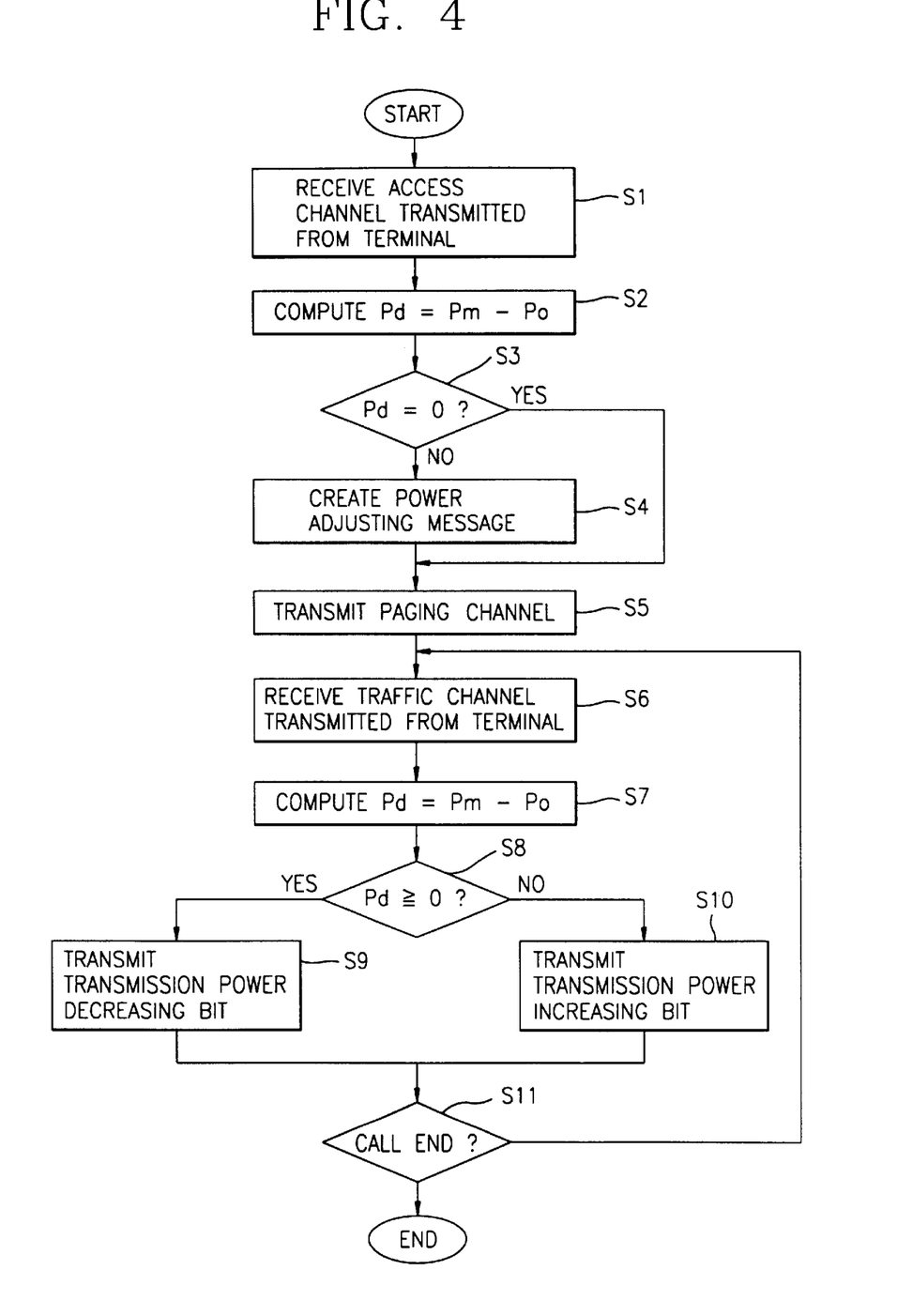
FIG. 4 is a flowchart illustrating a transmission power control method according to the present invention.

FIG. 4 is a flowchart of a transmission power control process of a base station in the mobile communication system using the CDMA method according to the present invention.

As shown in FIG. 4A, the transmission power control process is roughly divided into a power control process in an access mode(S1-S5) and a power control process in a traffic mode(S6-S11).

The power control method in the access mode includes: a step of receiving an access channel transmitted from a terminal(S1); a step of measuring a transmission power level Pm of the access channel, comparing the measured power level Pm with an adequate power level Po and computing a power deviation therebetween Pd(S2); a step of determining whether there is the power deviation Pd(S3); a step of creating a power adjusting message of n bits according to the power deviation Pd(S4); and a step of transmitting a paging channel with the power adjusting message to the terminal (S5).

In addition, the power control process in the traffic mode includes: a step of receiving the traffic channel transmitted from the terminal(S6); a step of measuring the transmission power level Pm of the traffic channel, comparing the measured power level Pm with the pre-setted adequate power level Po, and computing the deviation therebetween Pd(S7); a step of determining whether the deviation Pd is greater or smaller than '0'(S8); a step of transmitting a power decreasing bit to the terminal when the deviation Pd is greater than or equal to '0'(S9); a step of transmitting a power increasing bit to the terminal when the deviation Pd is smaller than '0'(S10); and a step of determining whether a call is finished, carrying out the power control process in the traffic mode(S6-S10) when the call is not finished, and ending the power control process when the call is finished(S11).

Figure 5:
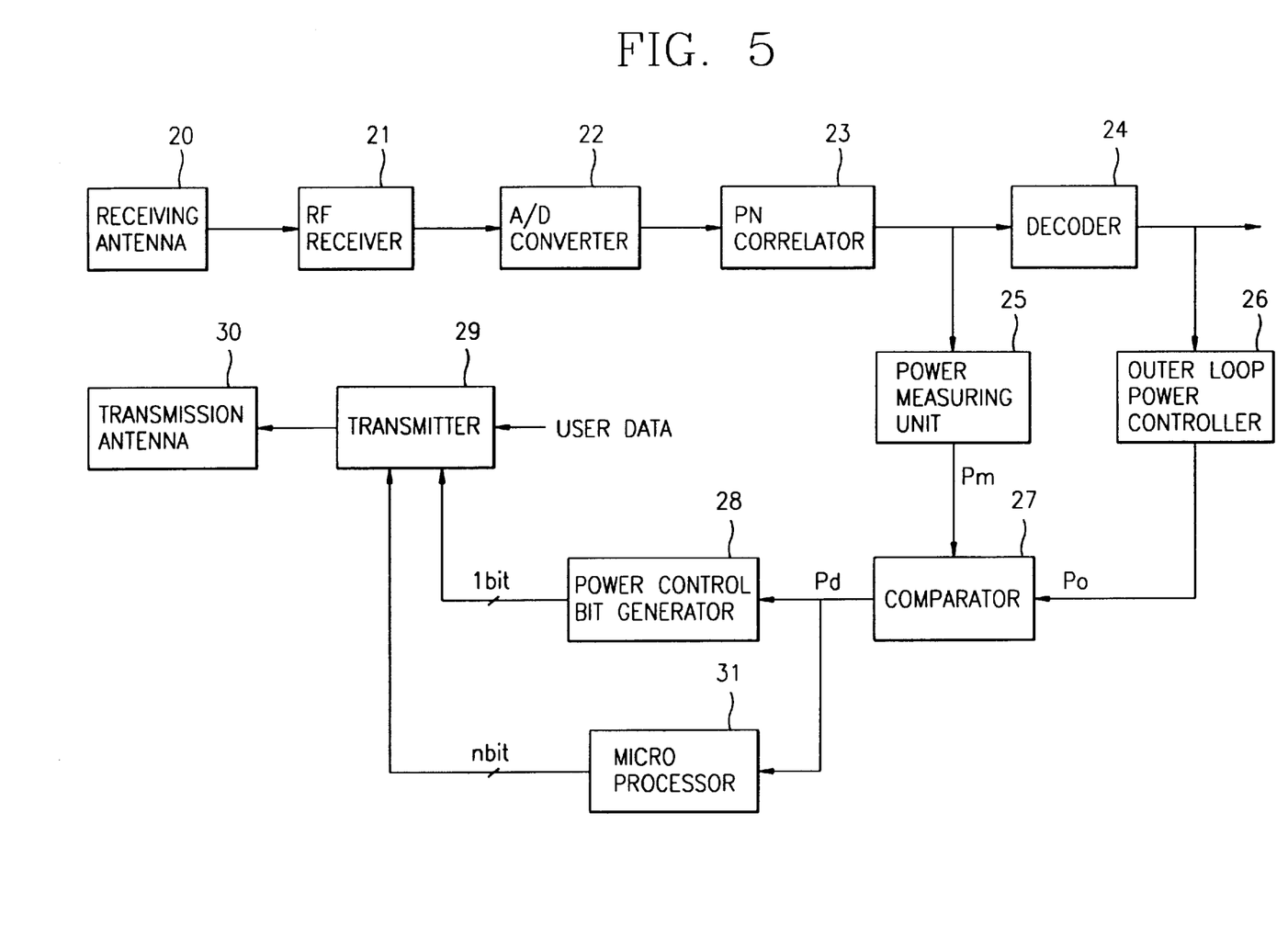
FIG. 5 is a block diagram illustrating a transmission power control device for carrying out the present invention.

FIG. 5 is a block diagram illustrating a transmission power control device of the base station for carrying out the present invention.

As illustrated in FIG. 5, the power control device according to the preferable embodiment of the present invention further includes a microprocessor 31 creating the power adjusting message of n bits with the deviation Pd between the measured transmission power level Pm of the currently-transmitted access channel and the pre-setted adequate power level Po, and transmitting the message to the transmitter 29. The other units thereof perform the identical operation to the conventional transmission power control device, and thus are provided with identical reference numerals, and will not be described.

The transmission power control process according to the embodiment of the present invention will now be explained in more detail.

First, as described in the conventional art, in order to start a call, the terminal (not shown) transmits the access channel to the base station by using the initial transmission power level computed by the open loop power control method. Here, the access channel is commonly used when a plurality of mobile stations firstly try to access to the base station in order to receive the traffic channel.

The base station receives the access channel through the receiving antenna(S1), and the signal is inputted to the RF receiver 21. The RF receiver 21 performs a down-frequency process on the inputted signal, converts the signal to a baseband signal and outputs the converted signal.

The signal which has been down-frequency processed by the RF receiver 21 is converted to a digital signal in the A/D converter 22. The pseudo noise (PN) correlator 23 correlates the digital signal by employing a PN code provided from a PN code generator (not shown).

The signal which has been outputted from the PN correlator 23 is inputted to the decoder 24, and to the power measuring unit 25 for measuring the transmission power of the mobile station (not shown) which has transmitted the access channel.

The decoder 24 decodes a code symbol regarding the inputted signal, and at the same time provides code error metrics displaying the quality of the CDMA signal to the outer loop power controller 26.

Accordingly, the outer loop power controller 26 is informed of a sufficient amount of transmission power for the mobile station (not shown) to transmit the data, sets the power control reference value Po to be used for the power control of a reverse direction link, and provides it to the comparator 27.

The comparator 27 compares the transmission power level Pm of the access channel transmitted from the terminal (not shown) which has been measured by the power measuring unit 25 with the adequate power reference level Po provided from the outer loop power controller 26, and provides the microprocessor 31 with the deviation Pd between the measured transmission power level Pm and the adequate power reference level Po(S2).

The microprocessor 31 serves to create the n-bits data with the inputted power deviation value Pd, and transmit it to the transmitter 29(S4).

The transmitter 29 transmits the n-bits power adjusting message applied from the microprocessor 31 to the terminal through the transmitting antenna 30 by using the paging channel(S5). Here, the paging channel serves to transmit to the terminal an acknowledge signal communicating that the base station receives the access signal.

Then, the terminal confirms that the base station assigns a channel to it according to the acknowledge signal of the paging channel transmitted from the base station, and starts to transmit a data through the assigned traffic channel.

Here, the transmission power of the initial traffic channel is determined by the n-bits data indicating the power deviation Pd transmitted through the paging channel.

Figure 6A:
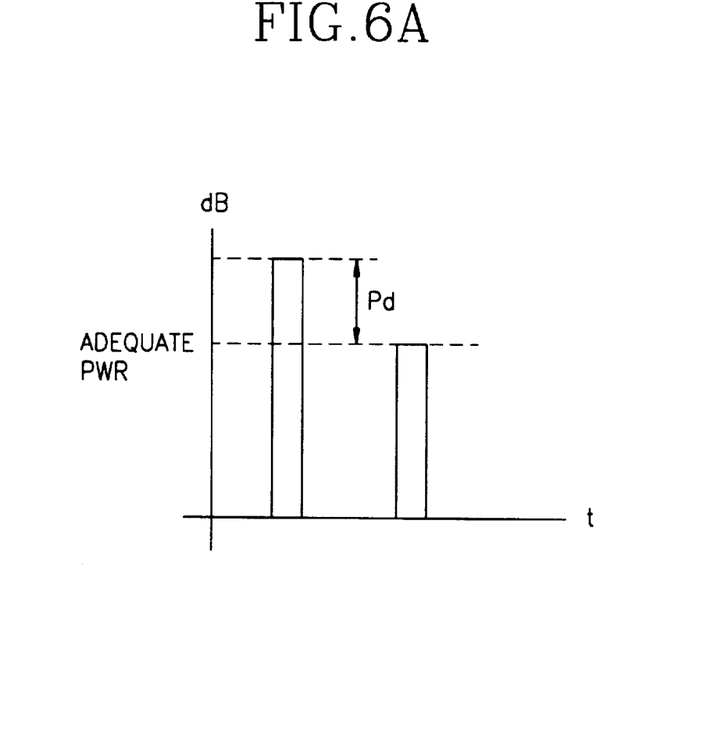
FIG. 6 illustrates a state of changing a transmission power level of a terminal according to the transmission power control method of the present invention.
Figure 6B:
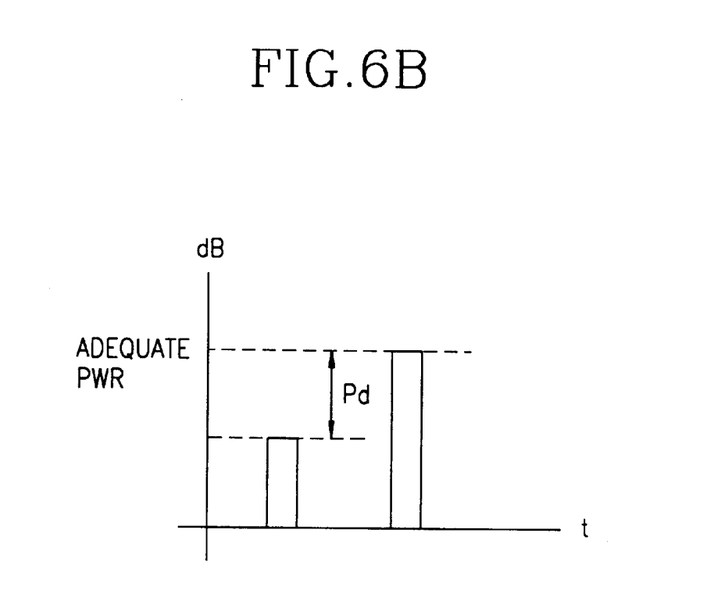

That is to say, as illustrated in FIGS. 6a and 6b, the transmission power is adjusted to the adequate power level at a time by increasing or decreasing the pre-setted transmission power level Pm in the initial access by the power deviation Pd.

Then, the transmission power control process of the traffic channel is identically carried out to the conventional one.

That is, the base station receives the traffic channel transmitted from the terminal(S6), and the power measuring unit 25 measures the transmission power of the traffic channel and provides the measuring result to the comparator 27.

The comparator 27 computes the deviation Pd between the adequate power reference level Po applied from the outer loop power controller 26 and the measured power level Pm(S7), and the power control bit generator 28 transmits the one-bit power decreasing bit when the power deviation Pd is greater than or equal to '0'(S9) according to the power deviation Pd inputted from the comparator 27(S8), and generates the one-bit power increasing bit in the case that the power deviation Pd is smaller than '0'(S10), thereby decreasing or increasing the current transmission power level by 1 dB.

Here, the one-bit power control bit is transmitted to the terminal through the traffic channel with the user data.

The power control process of the traffic channel is repeatedly carried out at intervals of a certain time until the call is finished(S11).

According to the present invention, the transmission power of the terminal can be rapidly controlled by employing the different transmission power control methods in the access mode and the traffic mode.

That is, the transmission power in the initial access has a remarkable difference from the adequate power level. The transmission power has been generally gradually controlled by 1 dB, thus delaying the access time and consuming much power. However, according to the present invention, the power deviation is data-processed and transmitted through the initial paging channel, thereby overcoming the above-mentioned disadvantages.

Also, when the access is finished, the transmission power of the traffic channel uses the one-bit power control bit identically to the conventional method, and the transmission power of the terminal is minutely controlled by 1 dB. As a result, the transmission power of the traffic channel can be controlled without delaying the time.

As discussed earlier, according to the present invention, a large volume of power is not unnecessarily used, thereby reducing the power consumption of the terminal, and interference among the users is prevented, thereby increasing the capacity of the entire system.

As the present invention may be embodied in several forms without departing from the spirit of essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A transmission power control method in a code division multiple access (CDMA) mobile communication system, comprising:
   computing a deviation between a transmission power value of an initial access channel transmitted from a terminal and a prescribed adequate power value;
   adjusting a transmission power of a terminal traffic channel to the adequate power level at one time by inserting the deviation value into a transmission power adjusting message for the terminal from a base station; and
   comparing the transmission power value of the traffic channel transmitted from the terminal with the prescribed adequate power value and incrementally adjusting the transmission power value of the traffic channel.

2. The method of claim 1, wherein the step for computing the deviation comprises:
   measuring the transmission power of the initial access channel transmitted from the terminal; and
   comparing the measured transmission power level of the access channel with the prescribed adequate power level and computing the deviation.

3. The method of claim 1, further comprising adjusting the transmission power in the terminal of the traffic channel to the adequate power level according to the transmission power adjusting message transmitted from the base station.

4. The method of claim 1, wherein the transmission power adjusting message is formed by converting the deviation between the measured transmission power level and the adequate power level to a n-bits digital signal.

5. The method of claim 1, wherein the transmission power adjusting message is transmitted to the terminal through a paging channel.

6. The method of claim 1, wherein the step of incrementally adjusting the transmission power of the terminal traffic channel comprises:
   measuring the transmission power of the traffic channel transmitted from the terminal;
   comparing the measured transmission power level with the prescribed adequate power level;
   transmitting an one-bit power control bit to the terminal accordingly to the comparison result; and
   one of increasing and decreasing the transmission power in the terminal of the traffic channel by 1 dB according to a power control bit value transmitted from the base station.

7. The method of claim 6, wherein the power control bit is a binary number for increasing the transmission power by 1 dB when the measured transmission power level is smaller than the adequate power level, and for decreasing the transmission power by 1 dB when the measured transmission power level is greater than or equal to the adequate power level.

8. The method of claim 6, wherein the power control bit is transmitted to the terminal through the traffic channel.

9. The method of claim 1, wherein the transmission power of the initial access channel signal transmitted from the terminal is controlled by the average power at which the terminal receives a signal transmitted from the base station and the message transmitted therefrom.

10. The method of claim 1, wherein the adequate power level is adjusted by a mobile speed of the mobile station, a circumstantial state thereof and an error rate of the data received by the base station.

11. The method of claim 1, wherein one transmission power adjusting message causes the transmission power of the terminal traffic channel to be adjusted from the transmission power value of the initial access channel to the prescribed adequate power value.

12. The method of claim 1, wherein the power adjustment cause by the transmission power adjusting message is greater than 1 dB.

13. The method of claim 1, wherein the deviation value comprises a n-bit digital signal.

14. The method of claim 13, wherein a transmission power of an initial traffic channel is determined by the n-bit data.

15. The method of claim 13, wherein n is greater than 1.

16. The method of claim 4, wherein n is greater than 1.

17. A transmission power control method in a code division multiple access (CDMA) mobile communication system, comprising:
   computing a deviation between a transmission power value of an initial access channel transmitted from a terminal and a prescribed adequate power value;
   adjusting a transmission power of a terminal traffic channel to the adequate power level at one time by inserting the deviation value into a transmission power adjusting message for the terminal from a base station; and
   adjusting the transmission power of the traffic channel of the terminal to the adequate power level according to the transmission power adjusting message transmitted from the base station.

18. The method of claim 17, wherein the step for computing the deviation comprises:

measuring the transmission power of the initial access channel transmitted from the terminal; and comparing the measured transmission power level of the access channel with the adequate power level and computing the deviation.

19. The method of claim 17, wherein the transmission power adjusting message is formed by converting the deviation between the measured transmission power level and the adequate power level to a n-bits digital signal.

20. The method of claim 19, wherein n is greater than 1.

21. The method of claim 17, wherein the transmission power adjusting message is transmitted to the terminal through a paging channel.

22. The method of claim 17, further comprising comparing the transmission power value of the traffic channel transmitted from the terminal with the prescribed adequate power value and incrementally adjusting the transmission power value of the traffic channel.

23. The method of claim 15, wherein incrementally adjusting the transmission power of the terminal traffic channel comprises:

measuring the transmission power of the traffic channel transmitted from the terminal;

comparing the measured transmission power level with the prescribed adequate power level;

transmitting an one-bit power control bit to the terminal according to the comparison result; and one of increasing and decreasing the transmission power of the traffic channel by the terminal by 1 dB according to the power control bit value transmitted from the base station.

24. The method of claim 16, wherein the power control bit is a binary number for increasing the transmission power by 1 dB when the measured transmission power level is less than the adequate power level, and for decreasing the transmission power by 1 dB when the measured transmission power level is greater than or equal to the adequate power level.

25. The method of claim 23, wherein the power control bit is transmitted to the terminal through the traffic channel.

26. The method of claim 17, wherein the transmission power of the initial access channel signal transmitted from the terminal is controlled by the average power at which the terminal receives a signal transmitted from the base station and the message transmitted therefrom.

27. The method of claim 21, wherein the adequate power level is adjusted by a mobile speed of the mobile station, a circumstantial state thereof and an error rate of the data received by the base station.

28. The method of claim 17, wherein one transmission power adjusting message causes the transmission power of the terminal traffic channel to be adjusted from the transmission power value of the initial access channel to the prescribed adequate power value.

29. The method of claim 17, wherein the power adjustment cause by the transmission power adjusting message is greater than 1 dB.

30. The method of claim 17, wherein the power adjustment caused by the transmission power adjusting message is fully made in one step.

31. The method of claim 17, wherein the deviation value comprises a n-bit digital signal.

32. The method of claim 31, wherein a transmission power of an initial traffic channel is determined by the n-bit data.

33. The method of claim 31, wherein n is greater than 1.

34. A method of controlling transmission power in a code division multiple access (CDMA) mobile communication system, comprising:

computing a deviation between a transmission power value of an initial access channel transmitted from a terminal and a prescribed adequate power value;

converting the deviation to a n-bit digital signal; and adjusting a transmission power of a terminal traffic channel to the adequate power level at once by inserting the n-bit digital deviation value into a transmission power adjusting message to send to the terminal.

35. The method of claim 34, further comprising:

measuring the transmission power of the traffic channel transmitted from the terminal;

comparing the measured transmission power level with the prescribed adequate power level;

transmitting an one-bit power control bit to the terminal accordingly to the comparison result; and one of increasing and decreasing the transmission power in the terminal of the traffic channel by 1 dB according to a power control bit value transmitted from the base station.

36. The method of claim 34, further comprising adjusting the transmission power of the traffic channel of the terminal to the adequate power level according to the transmission power adjusting message transmitted from the base station.

37. The method of claim 34, wherein the transmission power adjusting message is transmitted through a paging channel.

38. The method of claim 34, wherein n is greater than 1.

39. The method of claim 34, wherein the transmission power is at once adjusted by more than 1 dB.

* * * * *